N. C. ROOP.
AUTOMOBILE LOCK.
APPLICATION FILED OCT. 11, 1918.

1,289,003.

Patented Dec. 24, 1918.

WITNESSES
Ada M. Dunlap.
C. I. Small.

INVENTOR.
Nathan C. Roop.
BY Howard S. Smith,
ATTORNEY.

UNITED STATES PATENT OFFICE.

NATHAN C. ROOP, OF NEAR DAYTON, OHIO.

AUTOMOBILE-LOCK.

1,289,003.   Specification of Letters Patent.   Patented Dec. 24, 1918.

Application filed October 11, 1918. Serial No. 257,778.

*To all whom it may concern:*

Be it known that I, NATHAN C. ROOP, a citizen of the United States, residing in the county of Montgomery, near the city of Dayton, State of Ohio, have invented certain new and useful Improvements in Automobile-Locks, of which the following is a specification.

This invention relates to new and useful improvements in automobile locks.

The principal object of the invention is to provide for an automobile, a lock which is simple, economical and efficient. My improved lock contemplates the provision of linkage which not only is adapted to closely hug the forward and reverse speed pedals of an automobile, but is firmly braced or anchored in its locking position by means to be hereinafter described.

Figure 1:
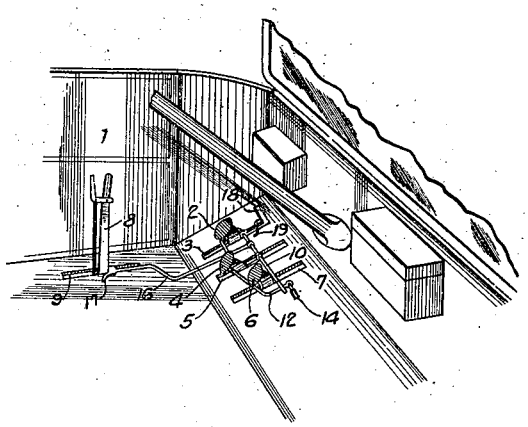
Figure 2:
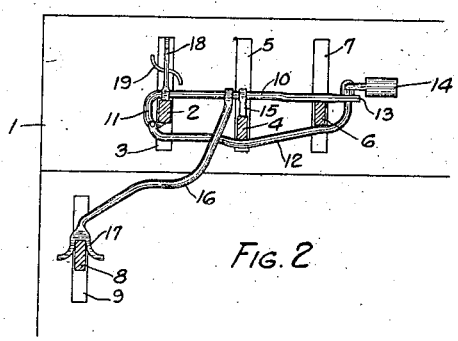
Figure 3:
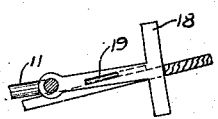

The preferred form of embodiment of my invention is illustrated in the accompanying drawings, of which Figure 1 is a perspective view of an automobile equipped with my improved locking device. Fig. 2 is a top plan view, partly in section, showing the application of my lock to an automobile. And Fig. 3 is a side elevational view of the bracing portion of my improved lock.

Throughout the specification and drawings, similar reference characters denote corresponding parts.

In a detailed description of the preferred form of embodiment of my invention, the numeral 1 designates an automobile of a well known type, provided with a speed pedal 2 movable in a slot 3, a reverse pedal 4 movable in a slot 5, and a brake pedal 6 movable in a slot 7. There is also an emergency brake lever 8, operable in a slot 9. While my improved lock is shown applied to the particular type of automobile illustrated, it may be adapted to other types providing a foot and hand control.

The lock itself comprises a longitudinal rod or bar 10 which terminates in a hook end 11 adapted to hug that portion of the pedal 2 which is just above the slot 3. Pivoted to the hook end 11 of the rod 10, is a preferably curved rod 12 whose outer end is turned at approximately right angles to the rod 10, to pass through the eyelet end 13 of the latter. (See Figs. 1 and 2.) The outer end of the rod 12 is perforated to receive a suitable padlock 14.

Firmly secured to the middle portion of the rod 10 is a preferably chisel-shaped inwardly projecting member 15 adapted to engage and restrain the inward movement of the reverse pedal 4 when the lock is in its applied position. A forked arm 16 rigidly secured to the rod 10 near the member 15, extends rearwardly to interpose its forked portion 17 in the path of forward movement of the emergency lever 8, to prevent it being thrust forward to start the machine.

To firmly brace the lock against a forward movement when great pressure is applied on the foot pedals, the following device is provided. This brace makes the lock thoroughly effective, for otherwise the parts might be subjected to too great a twisting movement when extreme pressure was applied to one pedal. Referring to Figs. 2 and 3, there is rigidly secured to the rod 10 in front of the pedal 2, a forwardly projecting T-shaped member 18 adapted to extend into the slot 3 ahead of the foot pedal 2. Extending loosely through the base part of the T-shaped member 18 is a transverse pin 19 whose ends are turned in opposite directions and in approximate alinement with each other. The ends of the pin 19 are adapted to lie flat on the inclined floor of the machine, on each side of the slot 3, to prevent the T-shaped member 18 from sinking too far into the slot. When the lock has assumed the position wherein it firmly hugs the pedal 2, the T-shaped member 18 will have the position in the slot 3, as shown in Figs. 1 and 2, whereby, when pressure is applied to the pedals, said T-shaped member will engage the front wall of the slot to effectively restrain a forward movement of said pedals as well as a forward movement of the lever 8. This brace serves to make the lock rigid at all times, even under great pressure, and furthermore acts as a complete bar to even a slight forward movement of the starting levers.

My improved lock is readily applied by inserting the T-shaped member in the slot 3, with the pin 19 turned as shown in Figs. 1 and 2 to support said T-shaped member at the proper level in said slot. The free end of the rod 12 is then swung around the rear ends of the pedals 2, 4 and 6, and its perforated end forced through the eyelet end of the rod 10, after which the padlock 14 is applied to the former. In the meantime the forked end 17 of the arm 16 is placed in the path of the forward movement of the hand lever 8. The starting levers are now firmly hugged by the lock, which is firmly braced in its locking position by the T-shaped member 18.

My improved lock may be constructed of steel, cast iron or other suitable material, and any efficient padlock may be used with it.

I do not wish to be limited to the details of construction and arrangement herein shown and described, and any changes or modifications may be made therein within the scope of the subjoined claims.

Having described my invention, I claim:

1. In a device of the type specified, the combination with the speed control pedals of an automobile, of a longitudinal restraining member adapted to be disposed in front of said pedals, a second member pivoted to one end of the first member and adapted to be turned to a position behind said pedals, locking means for connecting the free ends of said members whereby they may tightly hug said pedals, a device rigidly secured to the first member, extending forwardly into a slot through which one of said pedals is movable, to brace said member against a forward movement when pressure is applied to one or more of said pedals, and lateral means secured to said device for supporting it in said slot.

2. In a device of the type specified, the combination with the speed control pedals of an automobile, of a longitudinal restraining member adapted to be disposed in front of said pedals, a second member pivoted to one end of the first member and adapted to be turned to a position behind said pedals, locking means for connecting the free ends of said members whereby they may tightly hug said pedals, and a T-shaped member rigidly secured to the first member, and extending forwardly into a slot through which one of said pedals is movable, to restrain a forward movement of the first member when pressure is applied to one or more of said pedals.

3. In a device of the type specified, the combination with the speed control pedals of an automobile, of a longitudinal restraining member adapted to be disposed in front of said pedals, a second member pivoted to one end of the first member and adapted to be turned to a position behind said pedals, locking means for connecting the free ends of said members whereby they may tightly hug said pedals, a T-shaped member rigidly secured to the first member, and extending forwardly into a slot through which one of said pedals is movable, to restrain a forward movement of the first member when pressure is applied to one or more of said pedals, and a pin extending transversely through said T-shaped member, having its ends turned in opposite directions and in approximate alinement with each other, to rest upon the floor of the machine on each side of said slot, to support the T-shaped member in an engaging position therein.

In testimony whereof I have hereunto set my hand this 10th day of October, 1918.

NATHAN C. ROOP.

Witness:
  HOWARD S. SMITH.